United States Patent [19]

Howell, Jr.

[11] 4,106,599

[45] Aug. 15, 1978

[54] ELECTRIFICATION RAIL AND JOINT CONSTRUCTION

[76] Inventor: Alleyne C. Howell, Jr., 645 Mine Hill Rd., Fairfield, Conn. 06430

[21] Appl. No.: 828,837

[22] Filed: Aug. 29, 1977

[51] Int. Cl.² .............................................. B60M 1/34
[52] U.S. Cl. ................................... 191/27; 191/23 A; 191/44.1
[58] Field of Search ........................... 174/99 B, 99 E; 191/22 R, 23 R, 23 A, 27, 29 R, 32, 39, 40, 43, 44.1, 45 A; 238/231

[56] References Cited

U.S. PATENT DOCUMENTS

| 2,640,114 | 5/1953 | Wehr | 191/23 A |
|---|---|---|---|
| 2,835,752 | 5/1958 | Anjeskey et al. | 191/23 A |
| 2,990,458 | 6/1961 | Mabeoch | 191/44.1 X |
| 3,311,715 | 3/1967 | Corl et al. | 191/27 |
| 3,892,299 | 7/1975 | Kilburg | 191/22 R X |
| 3,902,579 | 9/1975 | Howell, Jr. | 191/29 |
| 4,049,092 | 9/1977 | Lillard et al. | 191/22 R X |
| 4,050,555 | 9/1977 | Ross, Jr. | 191/23 A |

*Primary Examiner*—Stephen G. Kunin
*Attorney, Agent, or Firm*—H. Gibner Lehmann; K. Gibner Lehmann

[57] ABSTRACT

A conductor rail construction, and a joint for connecting conductor rails of electrification systems as used for vehicles, cranes and the like, comprising rail members whose cross-sections are like the figure H, and joints each comprising a relatively thick connector block and a relatively thin clincher strip underlying the block, both adapted to extend into T-slots of the end portions of the rail members. The clincher strip is bowed or otherwise formed, and closely fits into undersized or V-grooves in the T-slots of the rail members, being flattened by screws threaded into the connector block whereby it forcibly wedges into said grooves to dominate and maintain precise alignment of the rail member end portions. Flanges of the end portions which define the slot opening are initially relatively angularly disposed, and are flattened into springing position by the force exerted against them by the connector block. Abraded under surfaces of the flanges are smeared with anti-oxidation compound and make improved contact with the connector block. The precise alignment effected by the clincher strip makes possible a precise positioning of the ends of stainless steel contact strips whereby smooth traversals from one strip to the other can be effected, especially since the contact strips are back-to-back with the clincher strip, thereby avoiding arcing, excessive shoe wear and noise, and making possible a press-fitting of heater wires into aligned grooves of the rail members, closely adjacent the contact liner without deformation or tearing.

25 Claims, 9 Drawing Figures

U.S. Patent     Aug. 15, 1978     4,106,599
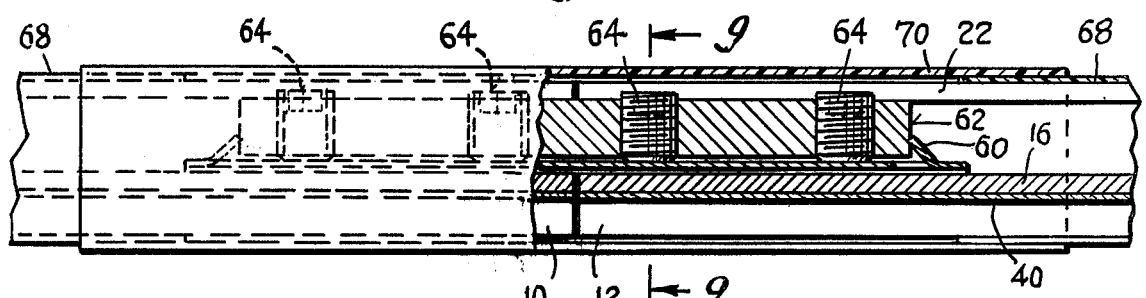
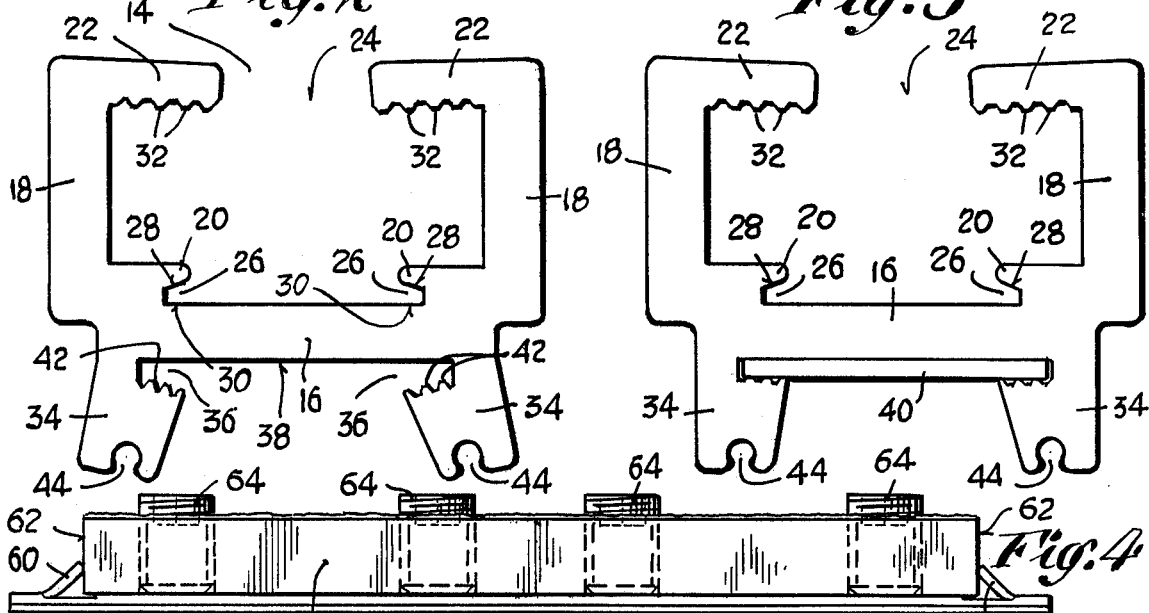
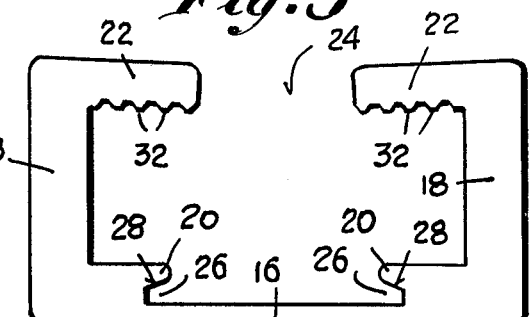
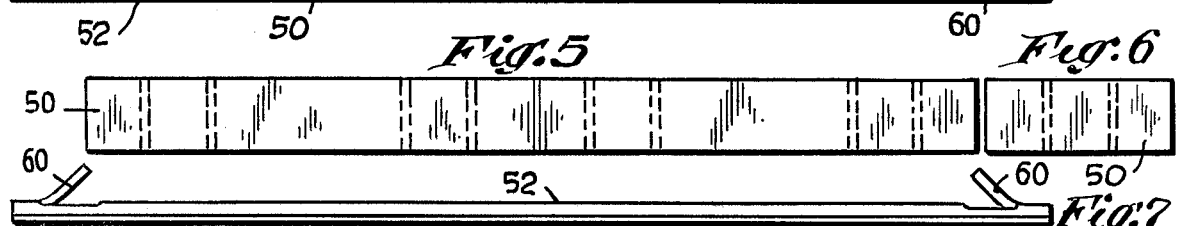
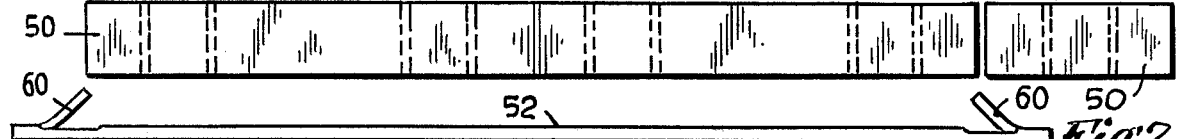
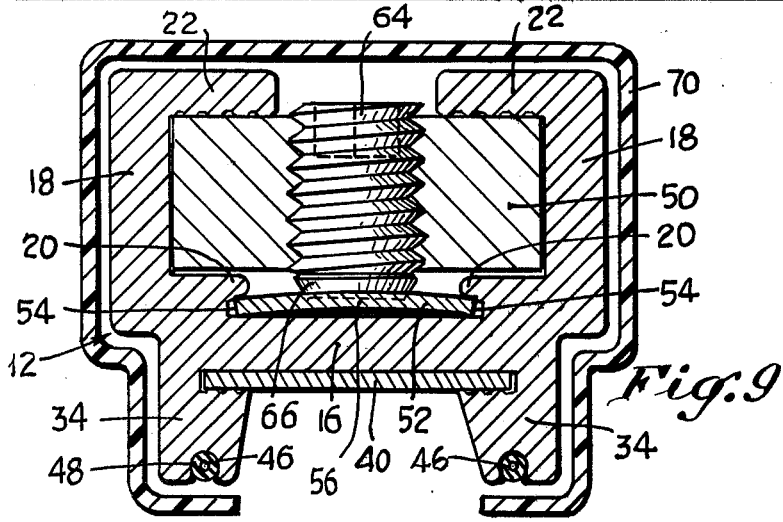
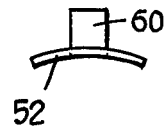

ELECTRIFICATION RAIL AND JOINT CONSTRUCTION

BACKGROUND

This invention relates to rail electrification systems such as used in connection with vehicles, cranes and the like, and more particularly to the construction of the rail members and joints employed with such systems.

In the past many types of conductor rails and connector devices or joints have been proposed and produced, to provide an essentially continuous conductor surface for engagement with current collecting shoes or brushes of a traveling piece of equipment. In recent years the trend has been to the use of extruded aluminum rail sections arranged to carry the current, and stainless steel contact liners or facing strips which are coextensive with the rail sections, arranged for engagement with the traveling collector or shoe. The rail sections, in many later installations, were made with T-slots by which convenient connection can be established with hanger insulators as well as rail connectors or joints which are adapted to couple together adjoining end portions of the rails.

While the prior rail constructions of this general type have in most instances proved to be generally satisfactory, as more exacting demands were made for improved performance and operating characteristics, the prior devices were found to be lacking because sufficiently precise positioning and alignment of the rail end portions was not had, and also because there was insufficient reduction of electrical losses resulting from the joint conductivity between adjoining rail sections. Misalignment of prior rail sections also resulted in objectionable noise, and caused increased shoe or collector wear. In addition, the incorporation of heater wires in the rail members was at best a difficult or time consuming task and sometimes caused tearing, and they were remote from the contact liners.

SUMMARY

The above drawbacks and disadvantages of prior rail electrification systems are obviated by the present invention, which has for one object the provision of an improved conductor rail member and cooperable joint construction which provide an especially precise and accurate alignment of the rail end portions at all times.

A feature of the invention resides in the provision of improved rail members, and an improved, precisely accurate rail joint as above set forth, which result in reduced collector wear, reduced sparking and improved quietness when the joint is traversed.

An additional feature of the invention is the back-to-back disposition of a clincher strip and the liner strips, minimizing the effect of dimensional variations of the extruded rail members and maintaining precise end-edge alignment of the liner strips.

Another feature of the invention resides in the provision of an improved conductor rail structure and joint in accordance with the foregoing, which provide for improved electrical conductivity between the rail sections.

A further object of the invention is to provide an improved rail and rail joint construction which enable heater wires to be easily installed at the liners without deformation or tearing, and also reliably retained in place.

Yet another feature of the invention resides in the provision of an improved conductor rail structure and joint which are especially simple, involving relatively few parts, and which are particularly economical to fabricate and produce.

Still another feature of the invention resides in the provision of improved rail and joint structures which can be easily assembled by the average workman, without requiring special expertise or a high degree of proficiency.

Still other features and advantages will hereinafter appear.

In accomplishing the above objects, the invention essentially provides a rail member and joint construction wherein end portions of the members have T-slots with bottom and side walls including groove or wedging shoulder means in the slots adjacent the bottom walls, and flanges which are opposite the bottom walls and define the opening of the T-slots. The ends of two such members can be abutted to align the T-slots thereof. The joint construction comprises a connector block and a coextensive clincher strip, both extending into aligned T-slots with the clincher strip between the block and the bottom walls of the T-slots, said strip having longitudinal edges which are adapted to engage the said shoulder means, and being formed as by a bowed configuration to locate center portions thereof closer to the block than the edges. The block carries set screws which can be tightened against the raised, center portions of the clincher strip to flatten and spread the latter whereby the longitudinal edges wedgingly engage the shoulder means of the rail members by a powerful aligning action and force these into perfect alignment with each other. Powerful wedging forces are obtained by the use of the set screws in the connector block, to not only reliably retain the desired precise alignment but also to prevent any possible separating movement of the rail sections.

In the accompanying drawings, illustrating a preferred embodiment of the invention:

FIG. 1 is a fragmentary side elevational view of the improved conductor rail construction and precise-alignment joint of the invention, portions being shown broken away and in section to reveal interior details.

FIG. 2 is a transverse cross-section of one of the conductor rail members of FIG. 1 as it is initially formed, preferably by extrusion.

FIG. 3 is a transverse cross-section like FIG. 2 but with a contact member or liner secured in place by crimping the rail member on it.

FIG. 4 is a side elevational view of an assemblage of the connector block and clincher strip joint members, the block being shown as smeared with an anti-oxidant compound.

FIG. 5 is a side elevational view of the connector block per se.

FIG. 6 is a end elevational view of the connector block of FIG. 5.

FIG. 7 is a side elevational view of the clincher strip per se.

FIG. 8 is an end elevational view of the clincher strip, and

FIG. 9 is a transverse section taken through an assembled joint construction, on the line 9—9 of FIG. 1.

Referring to FIGS. 1 and 9, two rail members 10 and 12 are illustrated, formed of extruded aluminum to have initially a cross-sectional shape as shown in FIG. 2. The rail members 10 and 12, in accordance with the invention, have T-slots 14, with bottom walls 16 and side walls 18 and including longitudinally extending spaced-apart wedging grooves or shoulder means 20 in said slots adjacent the bottom walls 16. The rail members have flanges 22 which are opposite the bottom walls 16 and which define the opening or mouths 24 of the T-slots.

Preferably, as shown, the spaced-apart longitudinal shoulder means 20 are formed to constitute part of the bottom walls 16, being characterized by V-grooves 26 arranged to have divergent wall surfaces 28, 30.

The under or inner surfaces of the flanges 22 are provided with longitudinally extending ribs 32 for purposes which are later brought out.

The rail members 10 and 12 have pairs of depending portions 34 located below the side walls 18 of the T-slots 14, such portions being provided with grooves or undercuts 36 that, together with the undersurfaces 38 of the bottom walls 16 provide a space adapted to receive a stainless steel liner strip or track 40. Longitudinal ribs 42 are provided in the grooves 36, said ribs being somewhat flattened or crushed when the rail portions 34 are forced inward to the assembled positions of FIG. 9 to clinch and retain the liner strip or track 40.

The depending portions 34 are also provided with undercut grooves 44 adapted to receive and to retain heater wires 46 having insulating jackets 48, this being an important feature as is later explained.

In accordance with the present invention, unique assemblages are provided, to be accommodated in the T-slots 14 of the adjoining end portions of two rail members to precisely align and connect the same together, one of said assemblages being illustrated herein and comprising a connector block 50 and a coextensive clincher strip 52 both extending into the T-slots, said clincher strip being disposed between the block 50 and the bottom walls 16 of the rail members. The clincher strip 52 has opposite longitudinal edges 54 which are engaged with the wedging shoulder means 20, said strip being formed so as to locate center portions 56 thereof closer to the block 50 than the longitudinal edges 54. This is preferably accomplished, in the simplest form of clincher strip, by merely transversely bowing the strip so that the convex side is presented to the block 50 and the concave side is presented to the bottom wall 16. The width of the bowed clincher strip 52 is such as to enable it to be initially freely slid between the shoulders 20 in the rail members. Preferably as illustrated in FIGS. 4 and 7, the clincher strip 52 has lanced upstanding lugs 60 adapted to engage the end surfaces 62 of the connector block so as to securely position these parts with respect to each other in assembly.

As provided by the invention, the connector block 50 has operable pressure members in the form of recessed-end set screws 64, preferably with wedge formations at their ends in the form of cup points 66. The set screws 64 are accessible through the mouths of the T-slots 14, as by means of a hexagonal screw wrench, whereby they can be tightened to bring the cup points 66 to bear against the bowed center portions of the clincher strips 52. The screws 64 are tightened sufficiently to virtually completely flatten and spread the clincher strip 52 whereby the opposite longitudinal edges 54 thereof are forced and wedged into the grooves 26 of the shoulder means 20. This action results in the adjoining end portions of the rail members being pulled strongly into perfect alignment with each other, and being securely held therein against dislodgement, misalignment or separation. The cup points 66 dig into the stainless steel clincher strips 52 and further insure against separation or pull-out of the joint. During such action of tightening of the screws 64, the connector block 50 will partially flatten or deform the longitudinal ridges 32 in the flanges 22, resulting in the establishment of an improved electrical contact between the rail members.

As provided by the invention, the flanges 22 are initially formed so as to be convergent with respect to the bottom walls 16 by the amount of several degrees. The under or inner surfaces of the flanges 22 are abraded, as with a wire brush or other suitable tool, and anti-oxidant compound is applied prior to the assembly of the joint. The connector block 50 is preferably of aluminum which is tin plated. By virtue of the foregoing, the tightening of the set screws 64 will result in an extremely effective and secure, highly electrically conductive joint being established between the rail members 10, 12. The flanges 22 will slightly flatten out so that they lay virtually in a common plane. The ribs 32 will be partially flattened and will remain in springing contact with the connection block 50 whereby the latter will in consequence establish an extremely efficient, low resistance electrical contact between the rail members. At the same time, the joint construction as above set forth will provide for perfect alignment of the end portions of the rail members, including perfect alignment of the liner strips or tracks 40 as well as the grooves 44 intended to accommodate the heater wires 46. The feature of the invention which provides back-to-back disposition of the clincher strip and liner strips minimizes dimensional variations of the extruded rail members and insures perfect track alignment. In consequence, there is had extremely quiet operation with a minimum of sparking and wearing of the collectors. The precise alignment of the grooves 44 enables the heater wires to be easily and quickly installed without damage or deformation.

It will be understood that the tightening of the screws 64 in the connector block 50 results in continual stress being maintained in the flanges 22, side wall portions 18 and bottom walls 16 of the rail members, as well as at the points adjacent the shoulder means 20. The expansion characteristic of the stainless steel clincher strip 52 being less than that of the extruded aluminum of the rail member, the effect of elevated temperatures will not result in any added or permanent deformation of the aluminum which could then result in a later looseness as the temperature drops. Moreover, the inherent spring action in the bowed stainless steel clincher strip 52 will provide for a certain amount of give-and-take during temperature changes.

The rail members 10, 12 can be provided with insulating jackets 68 of plastic substance, and plastic insulators 70 can be provided at the joints between the members.

In accordance with the present invention, the heater wires are located in the depending portions 34 of the rail members 10, 12 so as to be closely adjacent the stainless steel liner strips or tracks 40 thereby to more effectively maintain the latter free of icing. As seen in FIG. 9, the heater wires 46 are disposed on opposite sides of the tracks 40 and at a level slightly below the tracks, being imbedded in the portions 34 so as to effectively heat said portions and also the tracks. This provides the important advantage that the heat supplied by the wires is used most effectively, at the locations where it is needed most. The good heat conductivity of the aluminum in the portions 34 effectively conducts heat from the wires 46 to the tracks 40. The location and shape of the heater wire grooves allows easy installation and retention of endless lengths after the rail has been installed and whether or not it is furnished with an insulating cover.

It will be seen from the foregoing that I have provided an improved rail member and joint construction for electrification systems, which provide a precisely accurate alignment of the adjoining rail ends, improved electrical conductivity, quieter operation and less wear and tear on the collectors or shoes. Relatively few parts are involved, these being of especially simple construction, and the entire joint is economical to fabricate and produce, as well as being easy to assemble by the average skilled worker.

Variations and modifications are possible within the scope of the appended claims.

I claim:

1. A conductor rail joint, comprising in combination:
   (a) a pair of extruded metal rail members having juxtaposed and aligned end portions,
   (b) said end portions being provided with aligned T-slots, and having bottom walls and side walls including longitudinally extending spaced-apart integral shoulder means in said slots adjacent the bottom walls thereof, and also flanges which are opposite the bottom walls and which define the openings of the T-slots.
   (c) a connector block and a clincher strip extending into the T-slots of said rail end portions, said clincher strip being disposed between said block and the bottom walls of said end portions and having opposite longitudinal edges engaged with said shoulder means, said strip being pre-formed to an arcuate transverse cross section so as to locate center portions thereof closer to said block than said longitudinal edges,
   (d) operable pressure members carried by said block and engagable with said center portions of the clincher strip to flatten and spread the longitudinal edges of the latter such that they forcibly abut and wedge into said longitudinally-extending shoulder means, and
   (e) hard metal contact liner strips carried by the rail members closely adjacent those sides of the bottom walls which are opposite to said shoulder means, said clincher strip thus maintaining close alignment of both the shoulder means of the adjacent rail members and of the contact liner strips thereof.

2. A conductor rail joint as set forth in claim 1, wherein:
   (a) the spaced-apart shoulder means in the slots are formed in the bottom walls of the rail end portions,
   (b) said clincher-strip having an initial formation enabling it to be longitudinally, loosely received between said shoulder means prior to its being flattened and spread by said pressure members.

3. A conductor rail joint as set forth in claim 1, wherein:
   (a) the operable pressure members comprise recessed-end set screws which are threaded into the connector block.

4. A conductor rail joint as set forth in claim 1, wherein:
   (a) the clincher-strip comprises sheet metal which is bowed transversely of its length,
   (b) the concave side of said clincher-strip facing the bottom walls of the end portions of the rail members and the convex side of said strip facing the connector block.

5. A conductor rail joint as set forth in claim 1, wherein:
   (a) said flanges of the end portions of the rail members are formed to extend transversely in convergent directions with respect to the planes of the bottom walls,
   (b) said flanges tending to flatten when engaged with said connector block and when said pressure members exert a force against said clincher-strip.

6. A conductor rail joint as set forth in claim 1, wherein:
   (a) the inner surfaces of said flanges are provided with ribs for engagement with the connector block,
   (b) said ribs becoming partially flattened in response to pressure exerted on them by said connector block.

7. A conductor rail joint as set forth in claim 1, wherein:
   (a) the connector block is constituted of aluminum having a metallic plating which is not subject to rapid oxidation.

8. A conductor rail joint as set forth in claim 1, wherein:
   (a) the rail members are constituted of extruded aluminum, and
   (b) the clincher-strip is constituted of stainless steel.

9. A conductor rail joint as set forth in claim 1, wherein:
   (a) the clincher-strip is formed of sheet metal, and
   (b) the pressure members comprise set screws having wedge formations at their ends,
   (c) said wedge formations engaging and cutting into the clincher-strip, thereby to securely lock the latter and prevent separating movement of the rail members.

10. A conductor rail joint as set forth in claim 1, wherein:
    (a) the aligned end portions of the rail members have aligned longitudinally extending grooves, and
    (b) a heater wire having an insulating jacket, press-fitted into said aligned grooves.

11. A conductor rail joint as set forth in claim 1, wherein:
    (a) the clincher strip and liner strips are disposed closely adjacent each other and separated essentially by the thickness of said bottom walls.

12. A conductor rail joint, comprising in combination:
    (a) a pair of rail members having juxtaposed and aligned end portions,
    (b) said end portions being provided with aligned T-slots, and having bottom walls and side walls including longitudinally extending spaced-apart shoulder means in said slots adjacent the bottom walls, and also flanges which are opposite the bottom walls and which define the openings of the T-slots,
    (c) a connector block extending into the T-slots of said rail end portions,
    (d) means including operable pressure members carried by said block, for forcibly holding the latter in engagement with said flanges of the rail member end portions,
    (e) said flanges each being formed with a lower surface which extends transversely in convergent directions with respect to the planes of the bottom walls, and said flanges flexing and flattening when engaged under force by said connector block, whereby said lower surfaces engage and lie substantially flat against the facing surfaces of the connector block after the operable pressure members are tightened.

13. A conductor rail joint as set forth in claim 12, wherein:
   (a) the lower surfaces of said flanges are provided with ribs for engagement with the connector block,
   (b) said ribs becoming partially flattened in response to pressure exerted on them by said connector block.

14. A conductor rail joint as set forth in claim 13, wherein:
   (a) the lower surfaces of said flanges have abrasions and a coating of anti-oxidation compound smeared on said abrasions and contacting the adjoining surfaces of the block.

15. A conductor rail joint as set forth in claim 12, wherein:
   (a) the operable pressure members comprise set screws having wedge formations at their ends to enable them to dig into surfaces which they engage.

16. A conductor rail member for a rail electrification system, comprising:
   (a) an aluminum extrusion having end portions provided with T-slots, and having bottom walls and side walls including longitudinally extending spaced-apart opposed grooves at the bottom walls of said slots, and also flanges which are opposite the bottom walls and which define the openings of the T-slots,
   (b) said grooves being spaced inward from said side walls, and having divergent walls which are adapted to tightly wedge longitudinal edges of a clincher strip inserted therein.

17. A conductor rail joint comprising, in combination:
   (a) a pair of abutting symmetrical rail members in aligned end position,
   (b) the said members being roughly an H shape, the upper part being a box channel form providing at least four opposite faces to contain internal joint parts, the lower part being an open channel shape providing a web contact face and flange guide members for a collector shoe, the web of both channels being common,
   (c) angular slots in the flanges of the upper box channel form adjacent to the web,
   (d) a rectangular block and an arcuate spring member extending into the box channel form of each rail end, said spring member being disposed between the block and the web of the channel and contained in the angular slots adjacent thereto,
   (e) operable pressure members carried by said block engageable with the center portions of the spring member to flatten and spread the latter into continuing forcible contact with the walls of the angular slots.

18. A conductor rail member for a rail electrification system, comprising in combination:
   (a) an aluminum extrusion having a body, and below said body a wide longitudinally extending channel, and having spaced-apart guide portions forming said channel and adapted to guide a collector member riding in the channel,
   (b) said extrusion having grooves along both sides of said channel,
   (c) a liner strip disposed in said channel and having its opposite longitudinal edges contained in said grooves,
   (d) said liner strip being tightly pinched by said extrusion and being in intimate heat-exchanging relation with said guide portions thereof, and
   (e) a heater wire carried by one of said guide portions and arranged in good heat-exchanging relation therewith, said wire supplying heat to the one guide portion for transfer to said liner strip,
   (f) the heat from the wire, in travelling to the body of the extrusion, flowing directly past a longitudinal edge of the pinched liner strip, and heating the same.

19. A conductor rail member as in claim 18, and further including:
   (a) a second heater wire carried by the other of said guide portions of the extrusion, for transferring heat to said other guide portion for heating said liner strip.

20. A conductor rail member as in claim 18, wherein:
   (a) said heater wire is imbedded in the said guide portion and largely surrounded thereby to be retained therein.

21. A conductor rail member as in claim 18, wherein:
   (a) said one guide portion has a longitudinal slot, the mouth of which is narrow and has a lesser width than the remainder of the slot,
   (b) said heater wire having insulation and being disposed in said slot,
   (c) the narrow mouth of the slot holding the heater wire and insulation captive.

22. A conductor rail joint, comprising in combination:
   (a) a pair of rail members having juxtaposed and aligned end portions,
   (b) said end portions being provided with aligned T-slots, and having bottom walls and side walls including longitudinally extending spaced-apart shoulder means in said slots adjacent the bottom walls thereof, and also flanges which are opposite the bottom walls and which define the openings of the T-slots,
   (c) a connector block and a clincher strip extending into the T-slots of said rail end portions, said clincher strip being disposed between said block and the bottom walls of said end portions and having opposite longitudinal edges engaged with said shoulder means, said strip being formed so as to locate center portions thereof closer to said block than said longitudinal edges, and
   (d) operable pressure members carried by said block and engageable with said center portions of the clincher strip to flatten and spread the latter whereby the longitudinal edges thereof forcibly abut and wedge into said longitudinally-extending shoulder means, and
   (e) hard metal contact liner strips carried by the rail member adjacent those sides of the bottom walls which are opposite to said shoulder means,
   (f) said spaced-apart shoulder means being formed by V-grooves in the end portions of the rail members,
   (g) said grooves having divergent walls whereby the longitudinal edges of the clincher strip become tightly wedged in said grooves when the strip is flattened and spread by said operable pressure members.

23. A conductor rail joint as set forth in claim 22, wherein:
(a) the said grooves are formed in the bottom walls of the end portions of the rail members.

24. A conductor rail joint, comprising in combination:
(a) a pair of rail members having juxtaposed and aligned end portions,
(b) said end portions being provided with aligned T-slots, and having bottom walls and side walls including longitudinally extending spaced-apart shoulder means in said slots adjacent the bottom walls thereof, and also flanges which are opposite the bottom walls and which define the openings of the T-slots,
(c) a connector block and a clincher strip extending into the T-slots of said rail end portions, said clincher strip being disposed between said block and the bottom walls of said end portions and having opposite longitudinal edges engaged with said shoulder means, said strip being formed so as to locate center portions thereof closer to said block than said longitudinal edges, and
(d) operable pressure members carried by said block and engageable with said center portions of the clincher strip to flatten and spread the latter whereby the longitudinal edges thereof forcibly abut and wedge into said longitudinally-extending shoulder means, and
(e) hard metal contact liner strips carried by the rail member adjacent those sides of the bottom walls which are opposite to said shoulder means,
(f) the clincher strip comprising sheet metal which is bowed transversely of its length,
(g) the concave side of said clincher strip facing the bottom walls of the end portions of the rail members and the convex side of said strip facing the connector block,
(h) the clincher strip having lanced lugs engaged with the end surfaces of the connector block to effect a precise positioning of the strip with respect to the block.

25. A conductor rail member for a rail electrification system, comprising:
(a) a aluminum extrusion having end portions provided with T-slots, and having bottom walls and side walls including longitudinally extending spaced-apart opposed shoulder means in the bottom walls of said slots, and also flanges which are opposite the bottom walls and which define the openings of the T-slots,
(b) said shoulder means being spaced inward from said side walls,
(c) the spaced-apart shoulder means in the bottom walls of said slots being formed by V-grooves therein,
(d) the walls of said grooves being divergent and adapted to wedge a bowed clincher strip inserted therebetween after the latter has been flattened.

* * * * *